United States Patent [19]

Spongh et al.

[11] Patent Number: 4,486,843
[45] Date of Patent: Dec. 4, 1984

[54] TRANSITIONAL COMMAND POSITION MODIFICATION FOR A CONTROLLER

[75] Inventors: Rolf T. Spongh, Waterloo, Belgium; Jeffrey S. Noss, Bay Village, Ohio

[73] Assignee: Nordson Corporation, Amherst, Ohio

[21] Appl. No.: 354,314

[22] Filed: Mar. 3, 1982

[51] Int. Cl.³ .................. G06F 15/46; G05B 19/42
[52] U.S. Cl. .................................. 364/513; 364/193; 318/568; 901/7; 901/43
[58] Field of Search ............... 364/513, 474, 478, 191, 364/192, 193; 318/568; 414/730, 744; 239/69, 70; 901/2–5, 7, 41–43

[56] References Cited

U.S. PATENT DOCUMENTS

| | | | |
|---|---|---|---|
| 4,011,437 | 3/1977 | Hohn | 318/568 X |
| 4,021,651 | 5/1977 | Mitsuhashi et al. | |
| 4,025,838 | 5/1977 | Watanabe | |
| 4,086,522 | 4/1978 | Engelberger et al. | 364/513 X |
| 4,132,938 | 1/1979 | Sano et al. | |
| 4,140,953 | 2/1979 | Dunne | |
| 4,338,672 | 7/1982 | Perzley et al. | 364/513 |
| 4,403,281 | 9/1983 | Holmes et al. | 364/513 X |

*Primary Examiner*—Joseph F. Ruggiero
*Attorney, Agent, or Firm*—Wood, Herron & Evans

[57] ABSTRACT

A controller for a manipulator or robot having a plurality of power-driven, signal-controlled links interconnected to permit relative motion therebetween to define plural degrees of freedom. The links of the manipulator are controlled to perform movements corresponding to stored sequences of command positions. The controller stores, for each link, a sequence of command positions and is operable to add a further command position or a further sequence of command positions to the original sequence of command positions. In a non-synchronous mode of operation (where the movements of the robot are not sychronized with movement of the workpiece) or in a synchronous mode, a further command position is added to the end of the original sequence by producing a number of additional command positions and storing the additional command positions after the original sequence. The last of the additional command positions is substantially equal to the further command position. The position change per command of the additional commands is maintained generally constant. In like manner, in the nonsynchronous mode, the initial position of a further sequence of command positions can be added to the end of an original sequence. In a sychronous mode of operation a first and a second sequence of command positions can be connected. To do this, a portion of each original command sequence is replaced by a substitute sequence of command positions, preserving the correlation between the command position processing rate and the conveyor rate.

8 Claims, 12 Drawing Figures

AUTO HOMING
Fig. 5a

HOMING SUBROUTINE
Fig. 5b

AUTO HOMING
Fig. 6

NONSYNC LINKING
Fig. 7

SYNC LINKING
Fig. 8

TRANSITIONAL COMMAND POSITION MODIFICATION FOR A CONTROLLER

DESCRIPTION OF THE INVENTION

This invention relates generally to a controller for a manipulator having a plurality of power-driven, signal-controlled links wherein the links are manipulated to perform movements corresponding to sequences of command positions, and more particularly concerns such a controller which includes means for adding one or more further command positions to an original sequence of command positions with an appropriate transition therebetween.

A work-performing robot, or manipulator, typically includes a plurality of links interconnected to provide relative motion with a plurality of degrees of freedom. The links are each provided with a signal controlled actuator for powering the respective links, as well as a position transducer for providing a real-time signal correlated to the actual position of the robot link. In order to provide the actuator control signals, a sequence of command positions for each link is stored in a suitable memory device and the command positions are periodically retrieved and compared against the actual link position signals provided by the link position transducers. In response to the comparisons, link positional error signals are generated for each of the links and then input to the various link actuators. Therefore, closed loop servo techniques are utilized to drive the various link actuators to move the links to the desired command positions.

The sequences of command positions for the robot links, taken as a whole, constitute a complete program for a particular movement sequence to be performed by the robot. The program may be produced in various ways including the use of a relatively lightweight, manually manipulable simulator robot. The simulator robot is manually manipulated for setting a program of desired mechanical responses which it is ultimately desired to have the work robot perform. The position signals output from the simulator robot link transducers are recorded and/or processed to ultimately produce the sequences of command positions for the links of the work robot.

There are many applications for work robots such as welding and the application of various coating materials. As an illustrative example, a work performing robot may be used for spray painting specific articles of differing shapes. A program comprising sequences of command positions for the robot links are then produced to effect the spraying of paint onto such articles, each program taking into account the specific dimensions and paint requirements of the particular article. Each program, which is related to a specific part, has, for each link, a particular beginning command position and a particular end command position dependent upon the characteristics of the specific part. For example, if paint is to be sprayed onto a rectangular plate, the operator of a simulator would actually perform the desired spray painting using a spray gun at the end of the series of simulator links, perhaps beginning at the upper left hand corner of the plate and ending at the lower right hand corner, after a series of passes over the plate.

Hereinafter, a programmed "sequence of command positions" or a "program" will usually be used in reference to a single sequence of positions for a single link. It should be understood that the complete program for the robot as a whole includes a sequence of command positions for each link which is controlled to produce the desired total robot movement.

If a number of plates are to be painted sequentially by the work robot, it is desirable to have a command position at the end of the sequence to effect the return of the spray gun to a home position for beginning to spray the subsequent plate. However, for various reasons, it may be undesirable to try to add command positions to effect the return of the gun to the upper left hand corner of the plate location at the end of the sequence of command positions produced by using the simulator. For example, the program for painting the plate may also be used in other applications in which such a return to a home position is not appropriate. Or the operator of the manipulator may find it difficult to return the simulator arm to exactly the proper position corresponding to the beginning of the programmed sequence.

It may also occur that two programmed sequences must be connected together to produce a desired spray painting operation. With regard to the illustrative example of spray painting a series of plates, after the first side of each plate is painted, the plate may be turned and the other side of the plate painted. For various reasons, the beginning point for the spraying sequence for the second side of each plate may begin with the spray gun located in a different position from that at which it completed spraying the first side of the plate. For example, the plate might be differently located after being turned.

As noted earlier with regard to returning the spray gun to a home position, it is also often impossible to connect a subsequent sequence of command positions to a first programmed sequence of command positions at the time that a program is produced using the simulator. Therefore, it is desirable not only to be able to connect the end of a sequence of command positions to a home position, but also to be able to connect the end of a sequence of command positions to the beginning of another sequence of command positions.

It is also desirable to be able to connect the end of an original sequence of command positions with the homing position or the beginning of a subsequent sequence of command positions at a substantially uniform rate. This rate is advantageously the maximum possible rate consistent with the mechanical constraints of the particular robot. This will produce a smooth transition in a minimum amount of time.

It is one aim of the invention, therefore, to provide a robot controller which includes means for effecting such transitions between a sequence of command positions and one or more subsequent command positions at a uniform rate. It is a further aim of the invention to provide a controller for effecting such transitions at a maximum rate within the mechanical constraints of the particular work robot being controlled.

In the case of synchronous operation of the work robot, there arises an additional consideration. For example, in the case of a work robot spray painting a rectangular plate, in synchronous operation the plate is moved, such as by a conveyor, past the location of the work robot. The rate of processing of the position commands by the robot controller is sychronized with the movement of the conveyor. Therefore, it is not possible to produce a number of additional command positions in an added time interval to connect two sequences of command positions, as was described above for the non-synchronous condition. If an interval of command positions were to be added, the synchronization between the robot and the conveyor would be lost.

As an illustrative example, consider a situation in which a programmed sequence of command positions has been prepared for synchronous operation of the work robot, and a portion of the sequence is to be replaced by a substitute sequence. This substitute sequence may be, for example, prepared in order to correct a particular portion of the paint coverage of the plate during the spray painting operation or to allow for a slight variation between the workpiece plates and the plate from which the controller was originally programmed.

In this synchronized case, the difference in position between the end of a first portion of the original sequence and the beginning of the substitute sequence may be greater than the maximum movement rate achievable by the robot. And yet, as indicated earlier, no additional time may be used in creating a transition interval since this would destroy the synchronism between the movement of the robot and the movement past the robot of the plates to be painted. It is desirable that the transition between the sequences be made at a smooth, uniform rate.

It is therefore a further object of the invention to provide a controller for a work robot operating in synchronism with the movement of workpieces past the robot, including means to effect a smooth transition at a uniform rate from a first programmed sequence of command positions to a substitute sequence of command positions, without destroying the synchronization between the robot and the movement of the workpieces.

The objective of producing a smooth command position sequence transition at a uniform rate in both the non-synchronous and synchronous situations has been accomplished in accordance with certain principles of the invention by producing a number of transition command positions which effect movement of each link of the robot at a substantially uniform rate during the transition. In the non-synchronized condition, the transition command positions comprise a number of additional command positions which are added during a transition time interval. In the case of synchronized operation, a transition region is defined which extends over the end of a first portion of the original sequence of command positions and over the beginning of the substitute sequence of command positions without introducing a time interval for the transition.

Other objects and advantages of the invention, and the manner of their implementation, will become apparent upon reading the following detailed description and upon reference to the drawings in which:

While the invention is susceptible to various modifications and alternative forms, certain illustrative embodiments have been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as defined by the appended claims.

Figure 1:
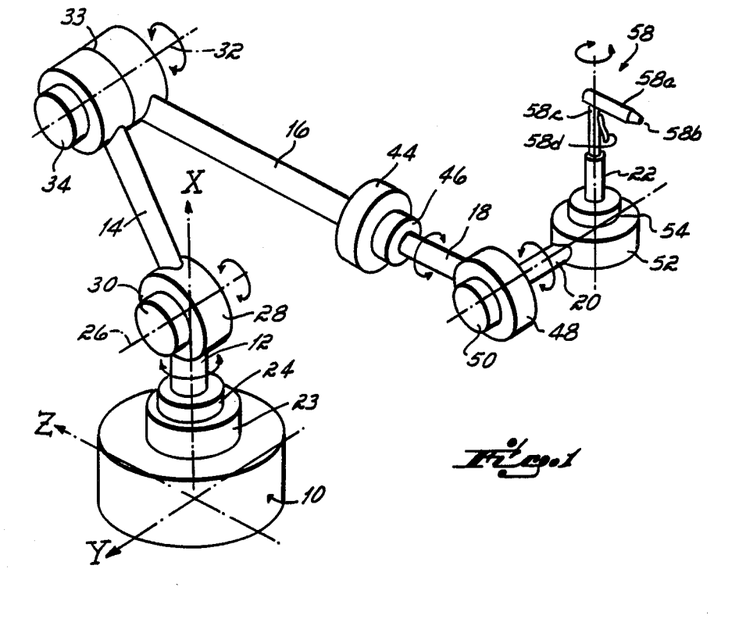
FIG. 1 is a perspective view, in schematic form, of a typical work-performing robot, or manipulator, showing the general relationship of the relatively massive robot links and their respectively associated actuators and position transducers.

With reference to FIG. 1, a typical work-performing robot, or manipulator, with respect to which this invention is useful for providing real time incrementing of position commands, indicative of motions which the robot is to execute relative to a workpiece, contained in a programmed series, is seen to include a base 10 which rests on the floor or other appropriate surface for supporting the robot. Extending from the base 10 are plural, series-connected, elongated, articulated members or links 12, 14, 16, 18, 20 and 22 which, in the preferred embodiment, provide the robot with several, in this instance six, degrees of freedom. In practice, the links 12, 14, 16, 18, 20, and 22 collectively constitute a relatively large mass. For example, the links 12, 14, and 16 are each approximately 1-4 feet in length, and typically weigh in the range of 10-400 pounds each. The links 18, 20, and 22 which, in the work-performing robot shown in FIG. 1 constitute a wrist, typically are significantly less massive than the links 12, 14 and 16, although this is not necessarily the case.

The link 12 is vertically disposed and mounted to the base 10 by a suitable joint which permits the link to rotate about its longitudinal axis which is coincident with the X axis. An actuator 23 is associated with the link 12, and is responsive to a position error signal provided by a conventional robot controller (not shown in FIG. 1) to facilitate selective, bidirectional, angular motion of the link 12 in an azimuthal direction about its longitudinal axis to the desired link position. Also associated with the link 12 is a position transducer 24 which provides an electrical signal correlated to the actual angular, or azimuthal, position of the link 12 relative to the base 10.

The link 14 at its lower end is connected to the upper end of the link 12 by a suitable joint for permitting pivotal, elevational movement of the link 14 in a vertical plane about a horizontal axis 26 which is perpendicular to the X axis and parallel to the Y-Z plane. Associated with the link 14 is an actuator 28 which is responsive to a position error signal from the robot controller and facilitates selective, bidirectional, elevational, pivotal movement of the link 14 about horizontal axis 26 to the desired link position. Also associated with the link 14 is a position transducer 30 which provides an electrical signal correlated to the actual elevational position of the link 14 relative to the link 12.

The link 16 at its inner end is connected to the upper end of the link 14 by a suitable joint for permitting the link 16 to move in a vertical plane about horizontal axis 32 which is parallel to axis 26. A suitable transducer 34 is associated with the link 16 for providing an electrical signal correlated to the actual angular elevational position of the link 16 with respect to the link 14. An actuator 33, associated with the link 16, is responsive to a position error signal from the robot controller and facilitates selective, bidirectional, elevational, pivotal movement of the link 14 about horizontal axis 32 to the desired link position.

The actuator 23 which bidirectionally drives the link 12 about the X axis provides the work-performing robot with one degree of freedom, namely, azimuthal positioning motion, while the actuators 28 and 33 which bidirectionally drive the link 14 and link 16, respectively, provide the robot with two degrees of freedom, each in an elevational direction.

The articulated links 18, 20, and 22 collectively constitute a wrist. Link 18 at its inner end is connected via a suitable joint to the outer end of the link 16. An actuator 44 is associated with the wrist member 18 for bidirectionally rotating, when input with suitable position error signals from the robot controller, the wrist member 18 to the desired link position about its longitudinal axis which is coincident with the longitudinal axis of the link 16. A suitable position transducer 46 is associated with the link 18 for providing an electrical signal correlated to the actual relative rotational position of the link 18 with respect to the link 16.

The link 20 is connected at its inner end via a suitable joint to the outer end of the link 18 for providing rotational movement of link 20 about its longitudinal axis which is perpendicular to the longitudinal axis of link 18. An actuator 48 is associated with link 20, and when input with suitable position error signals from the robot controller, bidirectionally rotates link 20 about its longitudinal axis perpendicular to the longitudinal axis of link 18 to the desired link position. A suitable position transducer 50 is also associated with link 20 for providing an electrical output correlated to the actual rotational position of this link relative to link 18.

Link 22 is connected via a suitable joint to the outer end of link 20 to facilitate rotation of link 22 about its longitudinal axis which is disposed perpendicularly to the longitudinal axis of link 20. An actuator 52 associated with link 22, when input with suitable position error signals from the robot controller, facilitates bidirectional motion of link 22 about its longitudinal axis to the desired link position. A transducer 54, also associated with link 22, provides an electrical signal output correlated to the actual relative rotational position of link 22 relative to link 20.

Link 22 constitutes the mechanical output element of the work-performing robot. While the mechanical output of the robot can be utilized for positioning a wide variety of devices, in the illustrated form of the invention the work-performing robot is utilized to position a spray coating gun 58 having a barrel 58a with a nozzle 58b which emits coating particles. The gun handle 58c is mounted to the upper end of the wrist link 22. The gun handle 58c mounts a suitable trigger mechanism 58d which, when actuated by a suitable signal-operated device (not shown), functions to control the emission of coating particles from the nozzle 58b of the spray gun 58.

The longitudinal rotational axes of wrist links 18, 20, and 22 are mutually perpendicular, and accordingly constitute three degrees of freedom for the robot. These three degrees of freedom, coupled with the three degrees of freedom of the links 12, 14, and 16, provide a total of six degrees of freedom for the work-performing robot.

In the operation of the work-performing robot shown in FIG. 1, a series of programmed, i.e., desired, link position command signals stored in a suitable memory device of the robot controller are periodically retrieved and compared against the actual link position signals provided by the link position transducers 24, 30, 34, 46, 50, and 54, and in response thereto the link positional error signals are generated for each of the links 12, 14, 16, 18, 20, and 22. The positional error signals for the various links 12, 14, 16, 18, 20, and 22 are then input to the various link actuators, 23, 28, 33, 44, 48, and 52, which typically are of the servo-controlled electrohydraulic type, for moving the links to the desired, or programmed, command positions which in turn reduce the positional error signals to zero. Thus, the links of the work-performing robot of FIG. 1 are driven through the programmed sequence of desired motions, or command positions, utilizing closed-loop servo techniques, by periodically comparing desired position command signals retrieved from the memory of the robot controller with actual link position signals from their associated position transducers, and using the resulting positional error signals associated with the different links to drive the various link actuators to the desired, or programmed, command positions.

Figure 4A:
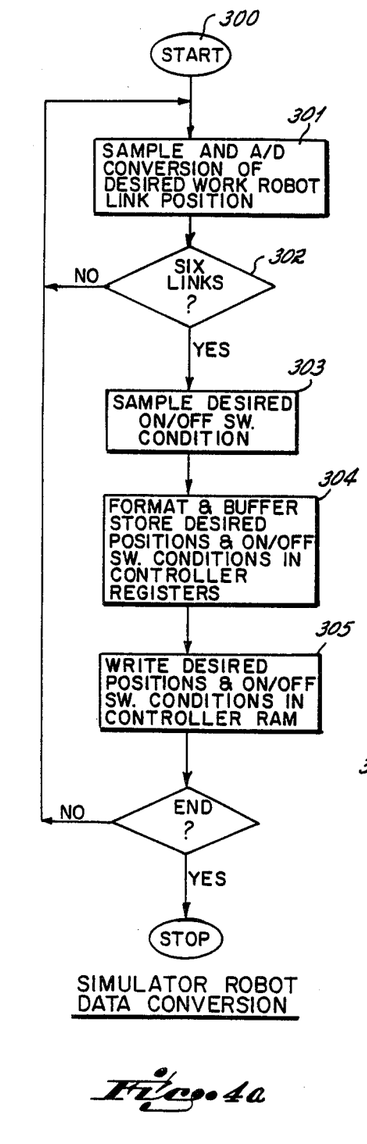
FIG. 4a is a flow chart of simulator robot data conversion in an illustrative form of robot system.

Since the robot controller, actuators, position transducers, closed-loop servo controls, and the like of the work-performing robot of FIG. 1 are well known and form no part of this invention, they are not further discussed in detail herein, except to the extent necessary to an understanding of the flow charts of FIGS. 4 and 5.

Figure 2:
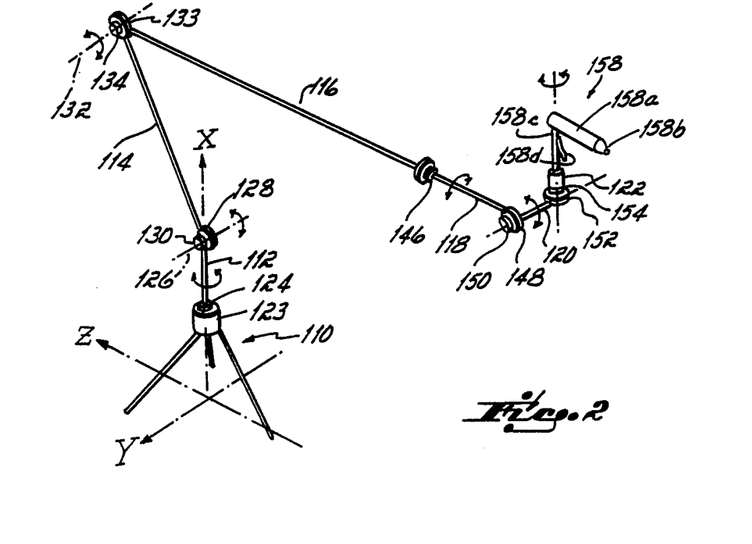
FIG. 2 is a perspective view, in schematic form, of a lightweight, hand manipulable simulator robot, or training arm, showing the general relationship of the simulator links and associated position transducers.

The robot simulator, or training arm, shown in FIG. 2, which is useful in preparing a programmed sequence of motions for input to the work robot for execution thereby relative to a workpiece, includes a tripod base 110 from which extends vertically a link 112 which is connected to the base for rotational movement about a vertical axis by a rotary joint 123. A position transducer 124 associated with the link 112 and base 110 provides an electrical signal correlated to the actual angular position of the link 112 relative to the stationary base. Pivotally connected to the upper end of the link 112 by a rotary joint 128 is a link 114 which pivots about axis 126. An angular position transducer 130 associated with the joint 128 and the link 114 provides an electrical signal correlated to the actual angular position of the link 114 with respect to the link 112. A link 116 connects to the link 114 via a rotary joint 133 for pivotal movement about axis 132. An angular position transducer 134 associated with the joint 133 and the link 116 provides an electrical signal correlated to the actual angular position of the link 116 with respect to the link 114.

Also included in the robot simulator depicted in FIG. 2 are links 118, 120, and 122 which are pivotally connected to links 116, 118, and 120, respectively, via rotary joints 144, 148, and 152, respectively. Angular position transducers 146, 150, and 154 associated with the rotary joints 144, 148, and 152, respectively, and the links 118, 120, and 122, respectively, provide electrical signals correlated to the actual angular position of the links 118, 120, and 122 with respect to the links 116, 118, and 120, respectively.

Mounted to the link 122 is a spray gun 158 having a barrel 158a, a nozzle 158b, and a handle 158c which mounts an ON/OFF switch 158d.

The length of the links 112, 114, 116, 118, 120, and 122 of the simulator robot of FIG. 2 are identical to the lengths of the links 12, 14, 16, 18, 20, and 22, respectively, of the work-performing robot shown in FIG. 1. Of course, the mass of the links 112, 114, 116, 118, 120, and 122 of the simulator robot of FIG. 2 are a mere fraction of that of their counterpart links 12, 14, 16, 18, 20, and 22 of the considerably more massive work-performing robot shown in FIG. 1. Similarly, the joints 123, 128, 133, 144, 148, and 152 of the simulator robot permit the same type of pivotal motion between their respectively associated links 112, 114, 116, 118, 120, and 122 as their counterpart rotary actuators 23, 28, 33, 44, 48, and 52 provide for their respectively associated links 12, 14, 16, 18, 20, and 22 of the work-performing robot.

When the spray gun 158 is moved manually by an operator grasping the handle 158c thereof through a sequence of motions necessary to spray coat an object, which is possible due to its lightweight construction, the various links 112, 114, 116, 118, 120, and 122 of the simulator robot move through a sequence of motions. Simultaneously, the transducers 124, 130, 134, 146, 150, and 154 of the simulator robot associated with the various simulator robot links 112, 114, 116, 118, 120, and 122 provide electrical outputs corresponding to the actual sequence of positions, or motions, through which the simulator robot links move in the course of manually moving the gun through the positions necessary to coat the object. These transducer signals corresponding to the actual positions of the different simulator robot links can be input directly to the robot controller or recorded by any suitable means (not shown in FIG. 2). Thereafter the recorded signals input to the robot controller of the work-performing robot are compared with signals correlated to the actual work robot link positions, and link position error signals are derived for input to the work robot link actuators to cause the work robot links to reproduce the motion of the simulator robot links in the manner previously described.

In the course of moving the gun 158 associated with the simulator robot through the sequence of motions necessary to spray coat the desired object, the operator periodically manually actuates the trigger 158d to permit spray coating material from the gun nozzle 158b. By recording signals corresponding to the position of switch 158d in conjunction with recording the position signals provided by the actual position transducers 124, 130, 134, 146, 150, and 154 of the simulator robot for the entire sequence of motions of the simulator robot links 112, 114, 116, 118, 120, and 122 produced by manual manipulation by the operator of the gun 158, a sequence of coordinated gun switch command signals and desired robot link position signals can be stored. These stored signals can then be input to the robot controller and stored, and subsequently repetitively read out from storage within the robot controller and used for repeating the programmed sequence of motions with the work-performing robot of FIG. 1 to coat the object with gun 58, which sequence of motions was first performed manually by the operator with the simulator robot and gun 158.

The rotary actuators 23, 28, 33, 44, 48, and 52 of the work-performing robot shown in FIG. 1 are typically of the hydraulic type, each including an electrohydraulic servo-valve for controlling the rate and direction of flow of hydraulic fluid therethrough.

Figure 3:
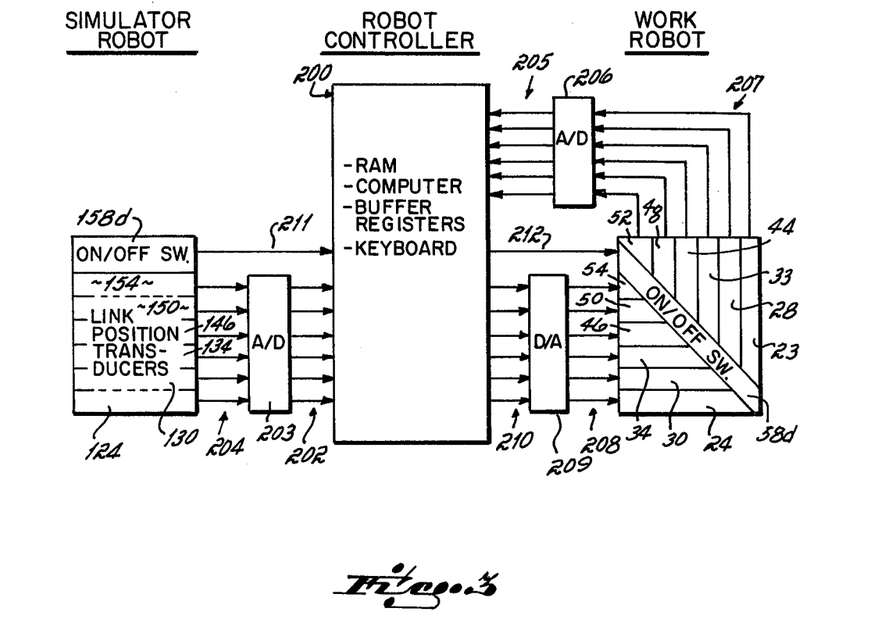
FIG. 3 is a circuit diagram in block format of a preferred embodiment of the invention.

Associated with the simulator robot and work robot of an illustrative robot system with which this invention is useful is a robot controller 200, which preferably comprises a specially programmed microprocessor. The robot controller 200 includes a random access memory (RAM) for storing a programmed sequence of desired or command positions for driving the various work robot links 12, 14, 16, 18, 20, and 22, as well as suitable buffer storage registers for temporarily storing the actual and desired positions of the work robot links and the computed positional errors therebetween which result when the work robot is input with, that is, driven by, the programmed sequence of desired positions stored in the robot controller RAM. Also included in the robot controller 200 are computing means for comparing desired work robot link positions and actual work robot link positions temporarily stored in the buffer registers and deriving in response thereto work robot link position error signals for input to the link actuators 23, 28, 33, 44, 48, and 52 of the work robot. During program generation, teaching or training, signals correlated to the desired work robot link positions 200 from simulator robot transducers 124, 130, 134, 146, 150 and 154 are input to the robot controller on lines 202 via an analog-to-digital converter 203 connected via lines 204 to the simulator robot position transducers. During program execution or playback, signals correlated to the actual work robot link positions from work robot position transducers 24, 30, 34, 46, 50 and 54 are input to the robot controller on lines 205 via an analog-to-digital converter 206 connected via lines 207 to the work robot position transducers, while the work robot link position error signals computed by the robot controller are output to the respective link actuators 23, 28, 33, 44, 48, and 52 of the work robot on lines 208 via a digital-to-analog converter 209 which receives the link position error signals on output lines 210.

The robot controller RAM also stores signals correlated to the desired condition of the ON/OFF switch 58d of the work robot. These ON/OFF switch condition signals are input during program generation to the robot controller RAM on line 211, and are output during program execution from the RAM to the ON/OFF switch 58d of the work robot on line 212.

In a given robot system, both during program recording or training with the simulator robot and program execution or replay by the work robot, the controller 200 processes position command signals at a specific rate, which may be constant or vary with time and/or which may be the same or different during program recording and program execution. For example, and assuming during program execution there is no interpolation by the controller 200 and no relative movement between the object being coated by the robot and the work station whereat the robot is located, the controller position command signal processing rate will be the same during both program recording and program execution. Thus, if there are six robot axes, during program recording the robot controller will sample and store in RAM for each simulator robot axis S simulator robot link position transducer signals (desired positions) per second. Similarly, during program execution the controller will, S times per second for each axis, fetch from RAM a position command (desired position), sample the work robot actual link position, and compute therefrom a position error signal for output to the link actuator. In a typical situation, S is 32, although other controller processing rates can be used if desired.

If interpolation is employed by the controller 200 during program execution to compute additional position commands between a pair of sequential position commands stored in RAM, the number of position commands per axis per second issued to the work robot will be greater than the number of position signals from the simulator robot sampled and recorded by the controller per second per axis.

If there is relative motion between the object being sprayed and the robot work station during program recording and program execution, the position command processing rate of the controller 200 may vary with time if the speed of the conveyor transporting the article being coated is varying with time and it is used to control the rate at which the controller fetches position commands (desired position) from RAM, samples the work robot actual link positions, and computes therefrom position error signals for output to the link actuators of the work robot.

For convenience, during program execution, the rate per axis, at which the controller 200 fetches commands from RAM, samples work robot actual link positions, and computes therefrom position error signals for output to the work robot link actuators is referred to herein as the controller "command position processing rate". In practice, the rate during program recording at which the controller 200 samples and stores in RAM the ON/OFF signals output from simulator robot switch 158d, and the rate the controller during program execution fetches from RAM and issues to the work robot ON/OFF switch 58d, the stored ON/OFF signals, are equal to each other as well as to the rate per axis at which the controller during program execution fetches position commands from RAM, samples work robot link actual positions, and computes therefrom position error signals for output to the work robot link actuators.

Assuming it is desired to record a programmed sequence of motions with respect to a workpiece for subsequent execution or replay by the work robot, the workpiece is located at the site of the simulator robot. An operator manipulates the simulator robot through the desired sequence of motions with respect to the workpiece. While the operator is manipulating the simulator robot, the outputs of the link position transducers 124, 130, 134, 146, 150 and 154 of the respective simulator robot links are input to the controller 200 via the A/D converter 203 where they are sampled, buffered and recorded in RAM. Additionally, the condition of the robot simulator ON/OFF switch 158d is input to the controller 200 on line 211 for sampling buffering and recording in RAM. This data collection step 301 is shown in the flow chart depicted in FIG. 4a.

More specifically, the desired analog link position signals on line 204 from the simulator are sampled and converted from analog to digital form in the analog/digital converter 203. The analog/digital converter 203 converts the inputs thereto which are in analog form to digital form on a time division multiplex basis. Upon the conclusion of the conversion from analog to digital of a single set of desired link position signals (steps 301 and 302), with a "set" consisting of one desired link position signal per link, the simulator robot ON/OFF switch condition signal on line 211, which is in digital form, is sampled in step 303. The digitized set of desired link position signals and the digital ON/OFF switch condition signal are input to the controller 200 via lines 202 and 211 where they are buffer stored in controller registers and, if necessary, reformatted in step 304 to be compatible with the robot controller 200. A "set" of link position signals and an ON/OFF switch condition signal are collectively referred to thereafter as a "group". The digitized, and if necessary reformatted group of desired link position and ON/OFF switch condition signals are then transferred to the controller RAM in step 305. Once this has been done for a single group of desired link position and ON/OFF switch condition signals, the process is repeated for the next group of desired link position and ON/OFF switch condition signals output from the simulator robot. When all groups of desired link position and ON/OFF switch condition signals output from the simulator robot have been sampled, and/or converted from analog to digital by the analog/digital converter 203, reformatted if necessary, and transferred from the controller buffer registers to the controller RAM, the data collection and storage phase shown in the flow chart depicted in FIG. 4a, which occurs during program recording, is complete.

Figure 4B:
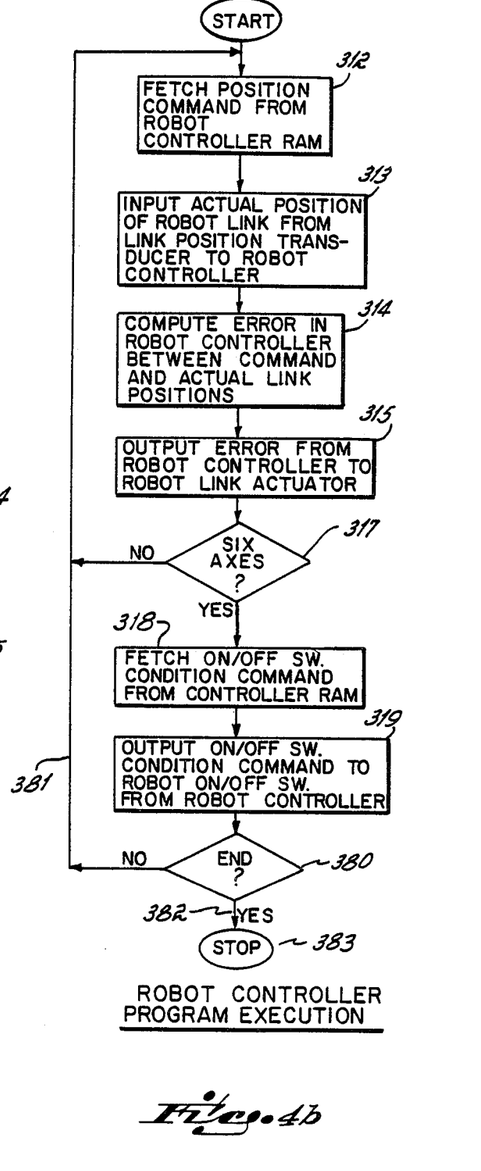
FIG. 4b is a flow chart of robot controller program execution for an illustrative form of robot system.

Following reading, reformatting if necessary, and storage in the controller RAM of all groups of desired link position and ON/OFF switch condition signals output from the recorder 201, the work robot drive phase, or program execution or replay, may be initiated, as shown in the flow chart of FIG. 4b. The steps 312–319 shown in the flow chart of FIG. 4b are sequentially repeated, at the controller command position processing rate, for each group of desired link position and ON/OFF switch condition signals until all groups of a program stored in the controller RAM are executed. Considering only one group of desired work robot link positions and ON/OFF switch condition signals, the robot controller program execution step is now described. Specifically, the desired work robot link position for the first link of the group is retrieved in step 312 from the robot controller RAM. The actual position of the work robot link in question is input via its respective line 207 and A/D converter 206 to the robot controller buffer register in step 313. The desired and actual work robot link positions are then compared and a work robot link position error for that particular link is computed by the robot controller in step 314. The work robot link position error signal is output via its respective line 210 to its respective work robot link actuator in step 315 via D/A converter 209 to position the work robot link.

The foregoing steps 312–315 are repeated in step 317 for each desired work robot link position signal of a group, there being as many desired work robot link position signals in a group as there are work robot links. When all desired work robot link position signals in the group have been processed in the manner indicated, the desired ON/OFF switch condition signal of the group is retrieved in step 318 from the robot controller RAM and transferred in step 319 to the ON/OFF switch 58d of the work robot via line 212, completing the execution of the robot controller program for a single group of desired work robot link position and ON/OFF switch signals. The steps 312–319 of the flow chart shown in FIG. 4b are repeated for each group of desired work robot link position and ON/OFF switch condition signals until all groups of desired work robot link position and ON/OFF switch condition signals have been input to the work robot to drive it through the desired sequence of motions which were programmed with the simulator robot at the workpiece site and stored in the controller RAM during the program recording phase. When this has occurred, the subroutine terminates at step 383. The execution rate for each group of desired work robot link position commands and ON/OFF switch commands is the controller "command position processing rate" heretofore defined.

Operation of the robot controller 200 at all times is under control of a main, or supervisory, program which, in addition to controlling, recording and executing a sequence of desired link positions stored in RAM, is also operative to facilitate such things as: turn-on and turn-off of the entire robot system when an appropriate POWER ON/OFF switch (not shown) is activated, continuous monitoring of hydraulic pressure levels in all work robot link actuators, orderly interruption of execution of a stored sequence of link positions by the work robot when a STOP button (not shown) is actuated, control of the orderly flow of data between the various components of the controller (RAM, buffers, etc.) and/or between the work and simulator robots and the controller, effecting various diagnostic, interlock and safety routines, etc. The main or supervisory program is interrupted, as necessary, to accomplish the routines and subroutines shown in FIGS. 4 and 5, as well as the various illustrative functions noted above, in accordance with techniques well known in the art, and therefore is not further discussed herein.

In accordance with the invention, the controller 200 includes means, for each link of the work robot, for connecting a sequence of desired work robot link command positions to a further command position and for connecting a sequence of desired work robot link command positions to another sequence of command positions. In effecting the desired connecting, additional command positions, or substitute command positions, are produced which are stored as a constituent part of a new programmed sequence.

As a first example, in a spray painting operation, it may be desirable to move the spray gun held by the robot or manipulator arm to a particular position at the end of a command sequence for controlling the robot to spray a particular part. This position may be considered to be a "home" position, from which the next spraying sequence will commence. This automatic homing operation for the manipulator requires the generation and storage of appropriate additional command positions for each robot link to be added to the end of the original sequence of command positions for that link. Since, for automatic homing, as well as the other command sequence connecting operations to be discussed herein, the treatment of each link is substantially the same, only the commands for a single link shall be considered herein with regard to each operation.

Figure 6:
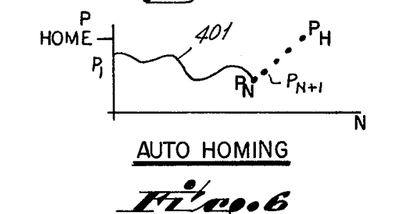
FIG. 6 is a graph of link position versus position commands illustrating automatic homing.

Referring now to FIG. 6, a programmed sequence 401 of command positions for a manipulator link extends from a first command position $P_1$ to a final command position $P_N$. The y-axis is scaled in terms of position values for the link, which may be, for example, angular positions of the associated link joint. The x-axis is scaled in terms of commands in the sequence of commands, which in a non-synchronized situation may be equally spaced in time such as at a 32 Hz. rate. In FIG. 6, this sequence 401 of command positions is illustrated as a continuous curve, although in reality it is a series of discrete points. The sequence is stored in the controller RAM after being produced, for example, by an operator using a simulator to generate desired position signals, as discussed earlier.

After the controller has executed the programmed sequence 401 by moving the manipulator link through the desired sequence of positions, utilizing the command positions at the particular command position processing rate, such as 32 Hz., the link is at the position $P_N$. If the home position $P_H$ is different from $P_N$, it is necessary to produce and store additional command positions at the end of the original sequence 401 in order to effect the desired movement.

Figure 5A:
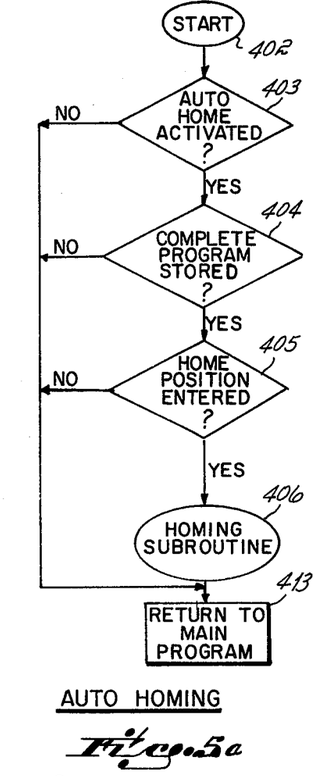
FIG. 5a is a flow chart of an auto-homing routine in accordance with an embodiment of the present invention.
Figure 5B:
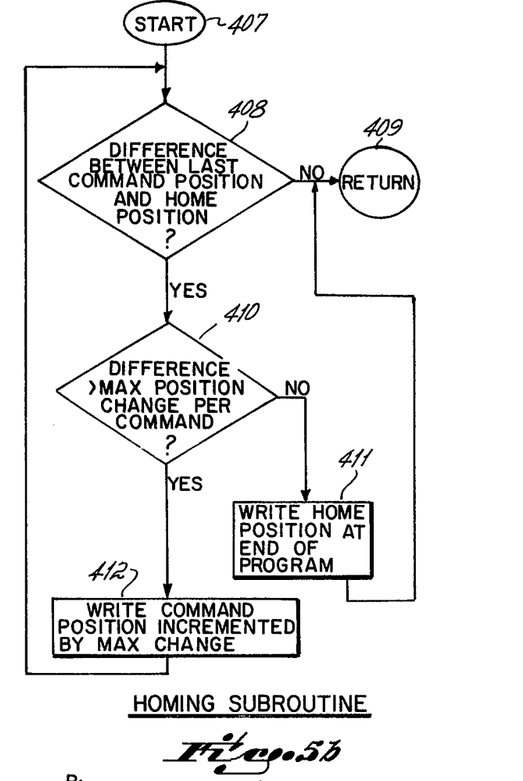
FIG. 5b is a flow chart of a homing subroutine in accordance with an embodiment of the present invention.

This is accomplished by execution of an automatic homing routine (FIG. 5a) in conjunction with a homing subroutine (FIG. 5b). In a typical situation, the original sequence 401 of command positions is stored in the controller RAM as a result of the performance of a desired spraying operation by an operator utilizing a simulator. The home position $P_H$ is selected as $P_1$ or entered into the controller, such as through a controller keyboard, to be held in a buffer register for temporary storage. A controller operator then activates the automatic homing routine by depressing an automatic homing button on the controller keyboard. In the course of executing the controller main program, the controller checks the various controller console buttons including the automatic homing button.

With reference now to FIG. 5a, at the START step 402 of the automatic homing routine, the controller makes the described check of the automatic homing button. In the step 403, the controller determines if the automatic homing button has been activated. If not, the controller returns to the main program. If automatic homing has been activated, the controller checks in the step 404 to determine if a complete programmed sequence of command positions, such as sequence 401, has been stored in the controller RAM. If a complete program has not been stored, the controller returns to the main program. If a complete program has been stored, the controller checks in the step 405 to determine if a home position has been entered. If a home position has not been entered, the controller returns to the main program. If a home position has been entered, the controller then executes an automatic homing subroutine 406.

The homing subroutine (FIG. 5b) commences at a START step 407. In the step 408, the controller determines the difference in position between the last command position $P_N$ of the sequence 401 and the home position $P_H$. If there is no difference, the controller returns to the automatic homing routine in the return step 409. If there is a difference between $P_H$ and $P_N$, the controller determines, in the step 410, if this difference is greater than a maximum allowable position change per command.

This maximum allowable position change per command for each link is stored in the controller memory. This maximum position change per command is a characteristic of the movement limitations of the particular work robot or manipulator which is being controlled by the controller for the particular command position processing rate such as 32 Hz.

If the difference between $P_H$ and $P_N$ is not greater than this maximum allowable position change, the home position $P_H$ is written and stored at the end of the program sequence 401 in the step 411, and the controller returns to the automatic homing routine. If the difference between $P_H$ and $P_N$ is greater than the maximum allowable position change, the controller, in the step 412, writes and stores a command position $P_{N+1}$, which is equal to the position $P_N$ incremented by the maximum allowable change. This position $P_{N+1}$ becomes the "last command position" in what is now a modified sequence of command positions. The controller then returns to the step 408 and again determines the difference between the last command position (which is now $P_{N+1}$) and the home position. The controller then operates in this loop of the steps 408, 410 and 412 until the difference between the last command position and the home position is either zero, or not greater than the maximum allowable position change. If the difference becomes zero, the controller returns to the automatic homing routine through the step 409, and if the difference amount becomes less than or equal to the maximum allowable position change, the controller executes the step 411 and then returns through the step 409 to the automatic homing routine.

Therefore, a number of additional command positions such as $P_{N+1}$, to and including $P_H$, are stored, having generally the maximum allowable position change per command. The position change between $P_H$ and the preceding command position may, of course, vary, while always being less than the maximum allowable position change. A number of these additional command positions are illustrated in FIG. 6. In FIG. 6, as in the subsequent graphs of FIGS. 7 and 8, the command positions generated by the controller are illustrated with the N-axis "stretched", or exaggerated, in order to illustrate the distinct points over this interval.

Once the additional command positions, if any, have been stored at the end of the original sequence 401 of command positions, when the controller returns from the homing subroutine 406 to the automatic homing routine, the controller then returns to the main program in the step 413. The added command positions, if any, are stored at the end of the original sequence 401 to form a modified sequence which will provide the desired automatic homing at the end of the paint spraying routine.

As can be seen, by utilizing additional command positions which differ from one another substantially uniformly by the maximum position change allowable, the stored commands effect the movement of the link to the home position smoothly and as quickly as possible at the end of the paint spraying sequence. This minimizes the amount of time which will elapse from the end of a spraying sequence to the time of proper positioning of the spray gun for the subsequent spraying sequence.

Figure 7:
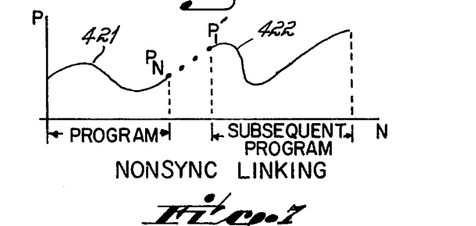
FIG. 7 is a graph similar to that of FIG. 6 but showing non-synchronous linking of two sequences of command positions.

Another exemplary command position sequence connecting operation which is performed by the controller is that of connecting a programmed sequence of command positions with a subsequent programmed sequence of command positions, as illustrated in FIG. 7. A first sequence 421 of positions for a manipulator link ends at a position $P_N$, and a subsequent sequence 422 of command positions begins at a position $P_1'$. Such connecting can occur, for example, where two program sequences are separately stored in the controller RAM after having been separately developed using a simulator under operator control to produce two different paint spraying operations. The sequences 421 and 422 may represent, for example, sequences for spraying two different sides or portions of a particular article.

As in the automatic homing situation, the difference in position between $P_N$ and $P_1'$ typically requires the generation of additional command positions in order to connect the end of the sequence 421 to the beginning of the sequence 422. The sequence linking of FIG. 7 is designated non-synchronous linking, meaning that the command position processing rate of the controller is not synchronized with movement of the articles to be sprayed. Therefore, an interval of time (number of commands) may be used for storing the necessary additional command positions between $P_N$ and $P_1'$ to connect the sequences. The necessary considerations for the synchronous mode of operation shall be considered hereinafter.

Figure 5C:
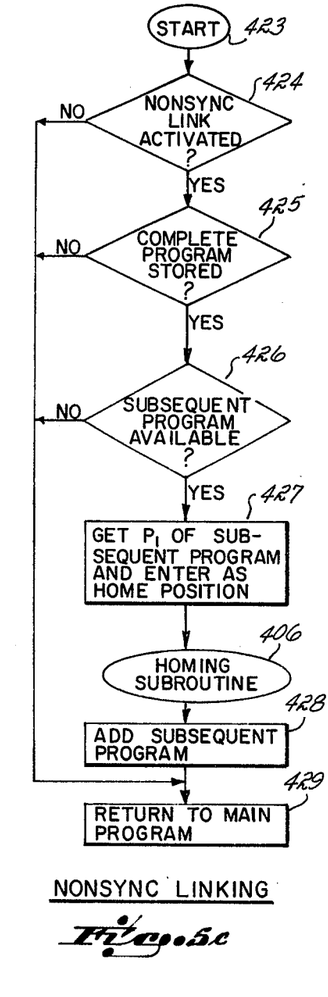
FIG. 5c is a flow chart of a non-sync linking routine in accordance with an embodiment of the present invention.

Typically, in order to initiate the non-synchronized linking of two sequences such as the sequences 421 and 422, an operator of the controller depresses a non-synchronized linking button, and the controller periodically checks the status of that button as illustrated in FIG. 5c, with the START step 423. The controller then checks in the step 424 to determine if the non-synchronous linking button has been activated. If it has not, the controller returns to the main program. If the non-synchronous linking button has been activated, the controller checks in the step 425 to determine if the sequence 421 is stored in RAM. If not, the controller returns to the main program. If the sequence is stored, the controller proceeds to the step 426. In the step 426, the controller determines if the subsequent sequence 422 is available, either stored in RAM or in a buffer register. If the subsequent sequence is not available, the controller returns to the main program. If the subsequent sequence 422 is available, the controller gets the position $P_1'$ in the step 427 and enters this position as the HOME POSITION in a buffer register. With $P_1'$ stored as the HOME POSITION, the controller then proceeds to the homing subroutine 406, discussed above.

The homing subroutine 406 operates in the manner described earlier, utilizing the $P_1'$ command position as the home position in performing the subroutine. Therefore, a number of additional command positions are generated by the controller and stored to and including the initial point $P_1'$ of the subsequent sequence 422. The controller then returns to the non-synchronized linking routine, and in the step 428 adds the remaining command positions from the program sequence 422 to produce a linked, combined program sequence, which is stored. The controller then returns to the main program in the step 429.

In both the automatic homing and non-synchronous linking operations, the connecting of command positions has been performed with the maximum allowable position change per command. However, for each additional command used, a finite amount of time is added to the final programmed sequence. It is possible to use automatic homing generally as described with synchronous operations if there is a sufficient non-spraying interval between spraying sequences.

The above-described non-synchronous connecting technique is, however, generally not usable in linking command positions where the operation of the work robot is synchronized with the movement of workpieces past the robot. For example, if articles to be sprayed during a spray painting operation are moved by a conveyor past the location of the work robot, and the motions of the work robot coordinated with the conveyor movement, it is impossible to interject an additional time interval into the programmed sequence in order to effect sequence linking as described above. This is because, in the synchronous mode, a selected unit of travel of the conveyor triggers the processing of a position command by the controller. Therefore, the commmand position processing rate of the controller is exactly synchronized to the conveyor movement, and the inclusion of additional command positions for a linking interval would destroy the necessary synchronization.

Figure 8:
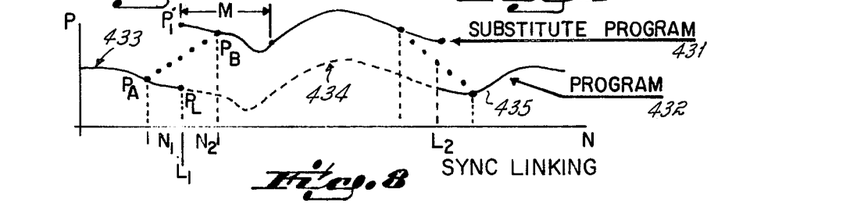
FIG. 8 is a graph similar to those of FIGS. 6 and 7 illustrating synchronous linking of different sequences of command positions.

An exemplary synchronous linking situation is illustrated in FIG. 8, wherein it is desired to replace a portion of an original programmed sequence with a substitute programmed sequence of command positions. The original programmed sequence 432 includes a first portion 433, an intermediate portion 434 which is to be replaced, and a final portion 435. The substitute sequence 431 extends for the same number of commands N as the intermediate sequence 434. A connecting operation must be performed in order to connect both the beginning and concluding ends of the substitute sequence 431 with the first and final portions of the original sequence 432. Since these operations are substantially similar, only the connecting of the beginning of the substitute sequence 431 with the first portion 433 of the original sequence 432 shall be discussed in detail.

The command location where the two sequences are to be connected is designated $L_1$. At this linking command location, there occur both the final command position of the portion 433 of the original sequence $P_L$ and the initial position of the substitute sequence 431 $P_1'$. If the position represented by $P_1'$ is less than or equal to a preset maximum position change per command, then $P_1'$ is substituted for $P_L$ in order to accomplish the connection of the first portion of the sequence 432 and the substitute sequence 431. If the position difference is greater than the maximum allowable position change per command, a number of connecting command positions must be generated. And, as indicated above, these positions cannot be merely added between the two sequences since that would destroy the synchronization between the conveyor and the work robot operation.

In order to perform the desired connecting of sequences without destroying the synchronization, a group M of commands of the intermediate portion 434 of the original sequence 432 are replaced directly by an equivalent number M of commands from the substitute sequence 431. The controller then modifies a number $N_1$ of command positions at the end of the first portion 433 of the sequence 432 and a number $N_2$ of the commands now present at the beginning of the group of commands M to effect the desired connecting. The exact operation of the controller is this regard shall now be described with reference to the flow chart of FIG. 5d.

Figure 5D:
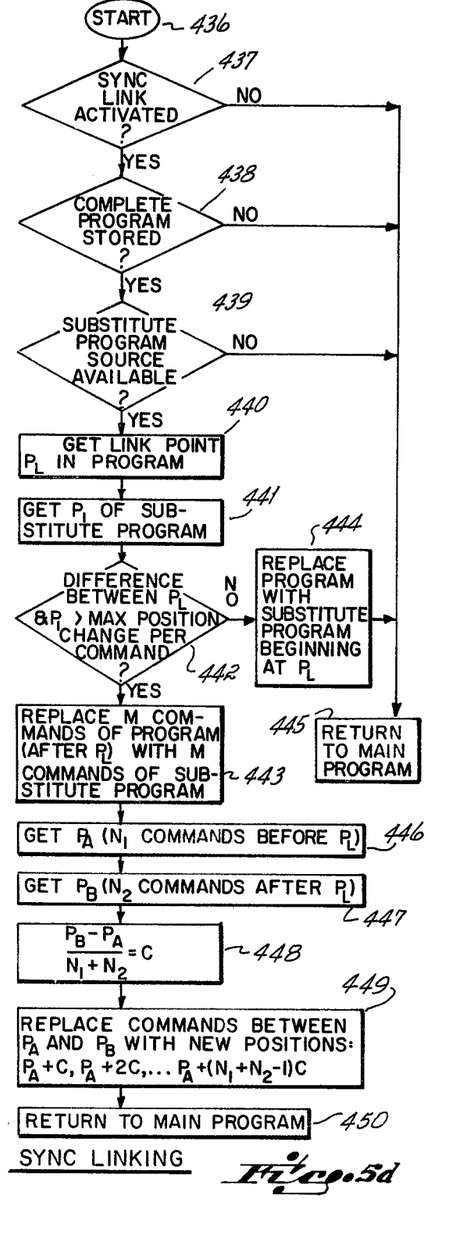
FIG. 5d is a flow chart of a sync linking routine in accordance with an embodiment of the present invention.

Typically, the operator of the controller activates a synchronous linking button to initiate the synchronous linking routine. The operator of the controller also enters the link point $P_L$ in the original sequence through the controller keyboard for storage in a buffer register. The controller enters the routine at a START step 436 and checks to determine if the synchronized linking button is activated in the step 437. If the synchronized linking button is not activated, the controller returns to the main program. If the synchronized linking button is activated, the controller checks in the step 438 to determine if the complete original programmed sequence 432 is stored in RAM. If the original sequence is not stored, the controller returns to the main program. If the original sequence is stored, the controller checks in the step 439 to determine if the substitute sequence is available either in RAM or in a buffer register.

If the substitute sequence is not available, the controller returns to the main program. If the substitute sequence is available, the controller gets the link point $P_L$, at the command location $L_1$, from a register in a step 440.

The controller then in the step 441 gets the command position $P_1'$ of the substitute sequence 431. In the step 442, the controller determines the difference between $P_L$ and $P_1'$, and if this difference is greater than the preselected maximum position change per command, the controller proceeds to the step 443. If the difference is not greater than the maximum position change per command, the controller in the step 444 replaces the portion 434 of the sequence 432 with the substitute sequence 431. The controller then returns to the main program in a step 445.

Returning to the situation in which the difference between $P_L$ and $P_1'$ is greater than the maximum allowable position change per command, the controller in the step 443 replaces a group M of commands of the sequence 432 (after the command position $P_L$) with a like number of commands of the substitute sequence 431.

There are stored in the controller memory two numbers, $N_1$ and $N_2$, of commands. The number $N_1$ is an arbitrarily selected number of commands, and $N_2$ is an arbitrarily selected number of commands, which may be, but need not be, equal to $N_1$. $N_1$ signifies a number of commands at the end of the portion 433 of the original sequence 432 which will be modified in the course of connecting the two sequences. Similarly, $N_2$ signifies a number of commands at the beginning of the group of commands M which will be modified during the connecting operation. $N_2$ is less than or equal to M.

Returning to the sequence of operation of FIG. 5d, after the controller has replaced M commands of the original sequence with a like number of commands of the substitute sequence, the controller in the step 446 gets a command position $P_A$ from the original sequence at a location $N_1$ commands before the link command location $L_1$. Then in the step 447, the controller gets a command position $P_B$, which is $N_2$ commands after $L_1$.

In the step 448, the controller calculates an incremental position differential C per modified command in the interval $(N_1+N_2)$. In the step 449, the controller then replaces the command positions between $P_A$ and $P_B$ (the commands in the $N_1+N_2$ interval) with new command positions, each incremented one from another by the position differential C. This produces a number of replacement command positions between $P_A$ and $P_B$ which vary in position at a uniform rate.

After the new position commands have been stored, the balance of the substitute sequence 431 is substituted for the balance of the intermediate portion 434 of the original sequence 432 (if the substitute sequence is greater than M). In the illustrated example, a similar connecting operation is then performed between the end of the substitute sequence 431 and the beginning of the final portion 435 of the original sequence 432 at the link command $L_2$.

It can be seen that the connecting of the two sequences 431 and 433 of command positions has been effected without changing the number of commands over the connecting interval. Instead, the command position values have been modified over a number of commands ($N_1+N_2$) in order to produce a transition interval for the connecting operation. The transition has a relatively uniform rate of change of position values as in the non-synchronous situations discussed earlier.

While specific examples of three different types of position and sequence linking have been described, variations falling within the scope of the invention are contemplated. For example, the synchronous linking operation described with regard to FIGS. 5d and 8, may be used to link together a subsequent sequence and an original sequence of command positions instead of the illustrated substitution within an original sequence. Or, the automatic homing operation illustrated in FIGS. 5a, 5b and 6 may be utilized to provide automatic homing at the end of a synchronous sequence of command positions if there is a sufficient dwell time between successive synchronous operations of the work robot.

What is claimed is:

1. A controller for a work robot or manipulator having a plurality of power-driven, signal-controlled links interconnected to permit relative motion therebetween to define plural degrees of freedom, the links being manipulated to perform movements corresponding to sequences of command positions making up a control program, comprising, for each link:
   means for storing a first control program made up of a sequence of command positions having an end command position;
   means for temporarily storing a further command position to be added to the first control program; and
   means for adding said further command position to the sequence of command position of the first control program including,
   (a) means for producing a number of additional command positions such that the position change per command is substantially constant, the last position of said additional positions being substantially equal to said further command position, the additional command positions being added to the end of said sequence of command positions of the first control program, and
   (b) means for storing said additional command positions at the end of said sequence of command positions of the first control program to form a second control program.

2. The controller of claim 1 which further comprises means for temporarily storing a further sequence of command positions, the first command position of said further sequence being said further command position and means for storing said further sequence of command positions after said additional command positions to form a second control program which includes the first control program, said additional command positions, and said further sequence of command positions.

3. The controller of either of claims 1 or 2 which further comprises means for storing a value of a maximum allowable position change per command and in which the means for producing a number of additional command positions includes means for producing said additional command positions such that the substantially constant position change per command is substantially equal to said maximum allowable position change per command.

4. A method for linking a sequence of command positions making up a first control program to a further command position in a controller for a work robot or manipulator having a plurality of power-driven, signal-controlled links interconnected to permit relative motion therebetween to define plural degrees of freedom, the links being manipulated to perform movements corresponding to sequences of command positions, comprising, for each link, the steps of:
   storing a first control program made up of a sequence of command positions having an end command position;
   temporarily storing a further command position;
   producing a number of additional command positions such that the position change per command is substantially constant, the last position of said additional positions being substantially equal to said further command position; and
   storing said additional command positions at the end of said sequence of command positions of said first control program to form a second control program.

5. The method of claim 4 in which the step of producing a number of additional command positions comprises producing a number of additional command positions such that the position change per command is substantially constant and equal to a maximum allowable position change per command which is stored in the controller.

6. A controller for a work robot or manipulator having a plurality of power-driven signal controlled links interconnected to permit relative motion therebetween to define plural degrees of freedom, the links being manipulated to perform movements corresponding to sequences of command positions, comprising, for each link:
   means for storing a first sequence of command positions having an end command position;
   means for storing a second sequence of command positions having a beginning command position;
   means for adding said second sequence to said first sequence of command positions including,
   (a) means for selecting a first command position a number of commands prior to said end command position in said first sequence of command positions,
   (b) means for selecting a second command position a number of commands after said beginning command position of said second sequence of command positions,
   (c) means for determining the difference in position between said first command position and said second command position, and
   (d) means for replacing the command positions between said first command position and said second command position with an identical number of replacement command positions with the incremental position change per replacement command being substantially constant and the total of said incremental position changes being substantially equal to the distance differential between said first command position and said second command position.

7. The controller of claim 6 in which the number of replacement command positions for the first sequence of command positions is equal to the number of replacement command positions for the second sequence of command positions.

8. A method for connecting a first sequence of command positions to a second sequence of command positions in a controller for a work robot or manipulator having a plurality of power-driven, signal-controlled links interconnected to permit relative motion therebetween to define plural degrees of freedom, the links being manipulated to perform movements corresponding to sequences of command positions, comprising, for each link, the steps of:

storing a first sequence of command positions having an end command position;

storing a second sequence of command positions having a beginning command position;

selecting a first command position a number of commands prior to the end command position of the first sequence of command positions;

selecting a second command position a number of commands following the beginning command position of the second sequence of command positions;

determining the position differential between said first command position and said second command position; and replacing the command positions between said first command position and said second command position with replacement command positions with the incremental position change per replacement command being substantially constant and the sum of said position increments being substantially equal to the position difference between said first command position and said second command position.

* * * * *